United States Patent [19]

Bouiller et al.

[11] Patent Number: 4,558,564
[45] Date of Patent: Dec. 17, 1985

[54] INTER-SHAFT JOURNAL ASSEMBLY OF A MULTI-SPOOL TURBO-MACHINE

[75] Inventors: Jean G. Bouiller, Brunoy; Marcel R. Soligny, Chevilly-Larve, both of France

[73] Assignee: Societe Nationale d'Etude et de Construction de Moteurs d'Aviation "S.N.E.C.M.A.", Paris, France

[21] Appl. No.: 543,047

[22] Filed: Oct. 18, 1983

[30] Foreign Application Priority Data

Nov. 10, 1982 [FR] France ................. 82 18863

[51] Int. Cl.⁴ .............................................. F02C 1/06
[52] U.S. Cl. .................................. 60/39.161; 415/69; 415/134
[58] Field of Search ................. 60/39.161; 415/66, 68, 415/69, 134, 142, 172 A; 308/184 R

[56] References Cited

U.S. PATENT DOCUMENTS

| | | |
|---|---|---|
| 2,657,084 | 10/1953 | Wiberg . |
| 3,250,512 | 5/1966 | Petrie ........................ 415/69 |
| 4,084,861 | 4/1978 | Greenberg et al. ............ 308/184 R |
| 4,283,096 | 8/1981 | Picard et al. .................... 308/207 R |
| 4,302,062 | 11/1981 | Hunter . |
| 4,304,522 | 12/1981 | Newland ............................ 415/142 |
| 4,378,197 | 3/1983 | Cattaneo et al. ..................... 308/187 |
| 4,428,713 | 1/1984 | Coplin et al. ........................ 415/142 |
| 4,451,110 | 5/1984 | Forestier et al. ............... 308/184 R |
| 4,453,784 | 6/1984 | Kildea et al. ........................ 308/187 |
| 4,457,667 | 7/1984 | Seibert et al. .................... 308/184 R |

FOREIGN PATENT DOCUMENTS

| | | |
|---|---|---|
| 435519 | 8/1939 | Belgium . |
| 042320 | 12/1981 | European Pat. Off. . |
| 581879 | 10/1946 | United Kingdom . |
| 778300 | 7/1957 | United Kingdom . |

Primary Examiner—Louis J. Casaregola
Assistant Examiner—Timothy S. Thorpe
Attorney, Agent, or Firm—Oblon, Fisher, Spivak, McClelland & Maier

[57] ABSTRACT

In a multi-spool turbo machine, a first shaft of the low pressure spool is supported for rotation with respect to a second shaft of the high pressure spool and is located with respect to the second shaft by means of a roller bearing. Rollers of the bearing are inserted between an internal ring mounted on the second shaft and an outer ring mounted by a ring support assembly carried by the first shaft. The ring support assembly includes a ring support member which comprises, at its outer periphery, a first toothed element cooperating with a second toothed element carried by retaining means. The ring support member is held axially by a channel-section member.

5 Claims, 4 Drawing Figures

INTER-SHAFT JOURNAL ASSEMBLY OF A MULTI-SPOOL TURBO-MACHINE

BACKGROUND OF THE INVENTION

1. Field of the Invention

This invention relates to an inter-shaft journal assembly of a multi-spool turbo machine.

2. Summary of the Prior Art

As is known, for example from French patent application No. 80.13116, turbo machines of the multi-spool type include journal bearing means which support in rotation a first shaft with respect to a second shaft and this journal bearing means includes a roller bearing inserted between an internal ring mounted directly on the first shaft and an external ring mounted within a casing itself mounted on the second shaft. In the practical application of the assembly described in the specification referred to, the first shaft disposed internally is constituted by a shaft of the high-pressure spool shaft line and the second shaft, disposed externally, is constituted by a shaft of the low pressure spool shaft line.

In these journal bearings operative between the shafts, deflections of mechanical origin under the action of centrifugal force and deflections of thermal origin give rise to play or clearance, in particular radial play during running of which the consequences are harmful. Vibrations which shorten the life of the bearings may result. The construction disclosed in the application referred to above, by adopting an "inverted" configuration, in which the low-pressure shaft surrounds the high-pressure shaft and supports the outer race of a roller bearing of large diameter which is connected to a member of the structure of which the temperature and the rotational speed are lower, improves the longevity of the journal bearing means by reducing deflections liable to cause radial play or clearance.

Solutions for damping vibrations by an oil film have been also applied. However, in spite of these precautions, in modern turbo machines, in particular high power multi-flow turbo-jet engines, achievement of high performance and the use of large diameters renders these prior arrangements inadequate to avoid deflections and deformations of the high pressure shaft; further the generation in the roller bearings of excessive radial clearances are harmful to the service life of the journal bearings which in turn, if not replaced, are capable of adversely affecting the conditions of dynamic operation of the rotor and the aerodynamic-thermal performance of the turbo-machine.

An object of the present invention is to improve an inter-shaft assembly of a turbo-machine, so as to avoid these disadvantages.

SUMMARY OF THE INVENTION

According to the present invention there is provided in a turbo-machine multi-spool inter-shaft bearing assembly comprising a first shaft of the low-pressure spool shaft line, a second shaft of the high-pressure spool shaft line located co-axially with the first shaft, journal bearing means including an internal ring rotatable with the second shaft, an external ring mounted by a ring support assembly for rotation with the first shaft and roller bearing members operative between said rings, the improvement comprising a first toothed element, a second toothed element, and an intermediate part, said elements and intermediate part together forming part of said ring support assembly, the toothed elements cooperating, following adjustment, with minimal clearance between meshing parts, and the intermediate part being secured for rotation with the first shaft, and means defining a body of revolution having a cross-section that includes a substantially U-shaped channel section, serving to locate axially a ring-support member of said ring support assembly and being secured to the first shaft for rotation therewith, the overall arrangement of the parts being such that any deformation and radial deflection of the low-pressure shaft act to cause relative radial displacement of the toothed elements substantially without corresponding displacement of the external ring of the roller bearing or the generation of excessive radial clearnanes in the journal bearing means.

By means of this assembly, the deformations and radial deflections of the low pressure shaft cause a relative radial displacement of the toothed elements without causing displacement of the outer ring of the bearing means, thus avoiding the generation of radial play within the bearing means, avoiding as a consequence generation of unbalanced forces in the rotary bodies and ensuring good dynamic operational conditions of the rotor especially with respect to minimal clearances at the blade tips of the rotor enabling a high level of aerodynamic/thermal performance of the turbo machine.

In accordance with a first embodiment of the invention, the ring support member comprises advantageously, at its outer periphery a number N of radially-distributed teeth constituting the first toothed element which cooperates with a number N of paired parts of which the outline of each one is inscribed within the theoretical volume of an imaginary right triangular prism of which one of the defining apices is replaced by a groove, thus forming two teeth of the second toothed element and of which groove the width is matched to the thickness of one of the corresponding said teeth, the said paired parts being secured by nuts and bolts against a radial face of the low pressure shaft.

Again, advantageously, the body of revolution fixes the axial location of the ring support member and comprises a radial flange interposed between a radial face of the low pressure shaft and the paired parts and forms with a radial flange axially spaced from an upstream retention member, a toroidal space for the said paired parts, the assembly of the said parts, the upstream retention member, the paired parts and the radial flange of the channel section member being secured by nuts and bolts against the radial face of the low pressure shaft.

According to a second embodiment of the invention, the ring support member comprises at its external periphery a number N' of longitudinal teeth or splines forming parts of the first toothed element, and these teeth cooperate with a number N' of tooth elements carried by a base cylinder. Each tooth has a profile which is matched to a groove between two teeth of the ring support member, the said elements being associated with or being secured by welding to the inner-periphery of an annular member, itself secured by nuts and bolts to a radial flange of the low pressure shaft.

According to the latter embodiment and preferably, the body of revolution is welded on one side on the upstream face of the ring support member and is secured by nuts and bolts on a radial flange of said annular member.

DESCRIPTION OF THE PREFERRED EMBODIMENTS

Figure 1:
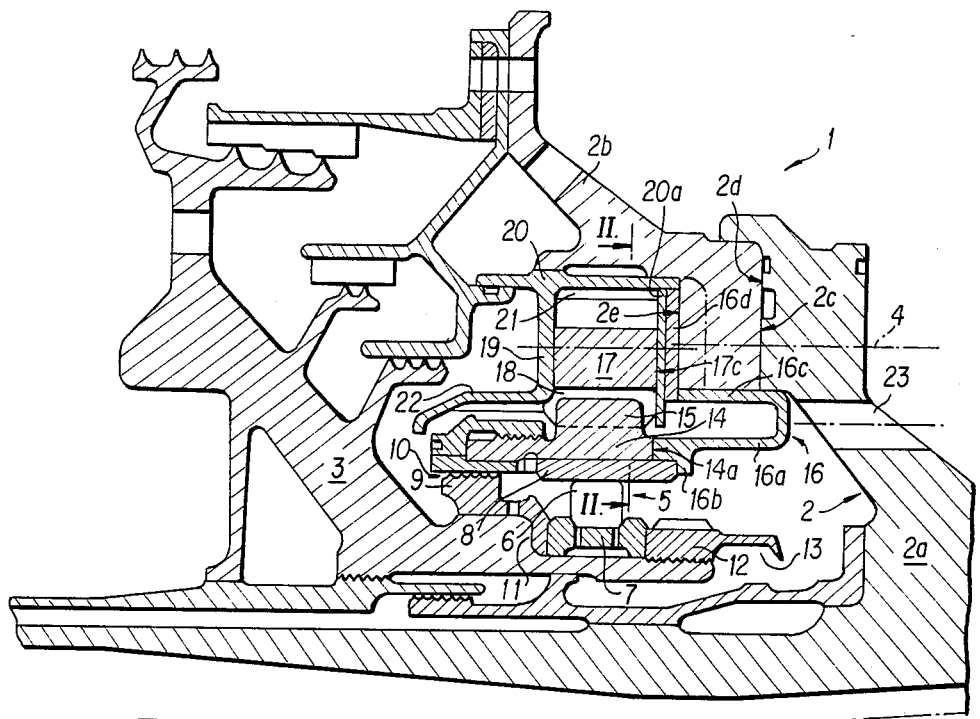
FIG. 1 is one half of a longitudinal axial section of that part of a multi-spool turbo-machine comprising a bearing assembly in accordance with a first embodiment.

The part of a multi-spool turbo-machine comprising a bearing assembly is illustrated in axial section in FIG. 1, and the assembly is designated by the general reference 1 and is in accordance with a first embodiment of the invention. The bearing assembly 1 is disposed between a first shaft 2 which forms a portion of the shaft line of the low-pressure spool of a gas turbine plant and a second shaft 3 which forms a portion of the high-pressure shaft line.

In the embodiment illustrated in FIG. 1, the lowpressure shaft line is constituted by the shaft itself 2a to which is fixed an annular member 2b extending towards the upstream end of the engine. These two parts 2a and 2b are assembled together by an array of bolts and nuts interconnecting two radial faces 2c and 2d each lying transversely of a plurality of lines 4 (only one shown). The low-pressure shaft 2, and in particular the annular member 2b, surrounds an end portion of the high-pressure shaft 3. The assembly 1 comprises a roller journal bearing 5 of which the rollers 6 are inserted between an inner or internal ring 7 and an outer or external ring The inner ring 7 is directly mounted on the high-pressure shaft 3 on which its axial position is determined, on the one hand, on the upstream face thereof by an externally serrated ring 9 forming a labyrinth fluid-tight seal 10 between the two rotary bodies and in abutment against a shoulder 11 of the high-pressure shaft 3 and, on the other hand, on the downstream face by an annular nut 12 comprising at its downstream end an annular extension 13 receiving oil intended for lubrication and cooling of the roller bearing 5.

The outer ring 8 of the roller bearing is mounted on a ring support member 14. The ring support member 14 comprises at its outer diameter a number N of regularly distributed teeth 15 which are formed in the manner of spline teeth. The ring support 14 is located axially at the downstream side by a body of revolution 16 having a cross-section that includes a substantially U-shaped channel section.

In the embodiment illustrated, the edge of the first limb 16a disposed on the inside of the channel 16 is welded, for example by electron beam welding, on to the downstream end face 14a of the ring support member 14. This limb 16a of the body 16 comprises also an internal radial flange 16b which forms an abutment for locating axially on the downstream side the outer ring 8 of the roller bearing. The second limb 16c disposed on the outside of the member 16 is extended by a radial flange 16d in abutment at a radial face 2e against the annular member 2b of the low pressure shaft 2. It will be noted that this member 16 is capable of resilient deformation in the radial direction perpendicular to the two limbs 16a and 16c thereof.

Figure 2:
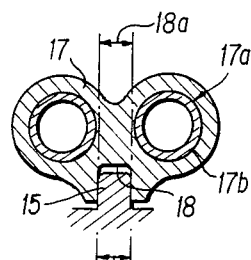
FIG. 2 is a frangmentary cross-section of the turbo-machine on the line II—II of FIG. 1.

On the outer periphery of the ring support member 14, a number N of paired parts (intermediate parts) are provided of which each can be inscribed in the volume of an imaginary right triangular prism. One of these parts 17 is illustrated in FIG. 2 in section on a transverse plane perpendicular to the longitudinal axis of the turbo-machine. Each portion of the paired part 17 has a bore 17a in which is located by a shrink fit a tube 17b. One of the apices of the imaginary prism is replaced by a groove 18 of which the width 18a is matched to the thickness 15a of one tooth 15 of the ring support member 14. This matching enables adjustment without appreciable clearance between the respective teeth 15 and the grooves 18 and in particular eliminating therefrom the effect of manufacturing tolerances between the elements.

A radial flange 19 of an annular retention member 20 defines with the radial flange 16d of the member 16 a toroidal chamber in which are located the paired parts 17.

Securing means in the form of nuts (not shown) on the axes 4 also interconnect the two parts 2a and 2b of the low-pressure shaft 2, the radial flange 16d of the member 16, one of the N paired parts 17 and the radial flange 19 of the retention member 20.

The retention member 20 also comprises an annular, generally axial, flange 22 on which is formed, under centrifugal action, an annular oil film by which lubrication and cooling of the teeth in the grooves 18 are provided. On the downstream side, an intermediate annular plate 20a disposed between the flange 16d of the member 16, and the cooperating face 17c of the paired part 17 forms the lubrication enclosure of the teeth 15 and of the grooves 18. Oil return to oil recovery reservoirs after lubrication and cooling of the bearing assembly 1 is effected through bores 23 of the low-pressure shaft 2.

The bearing assembly which has just been described enables complete elimination of any rigid connection between the first shaft 2 and the ring support member 14 and, as a consequence, the outer ring of the roller bearing mounted thereon and the low pressure shaft. In practice, in the event of deformations of the shaft and radial deflections of mechanical or thermal origin of various kinds, the radial displacement between the teeth 15 and the grooves 18 enables the ring support member 14 to remain perfectly centered while maintaining as a consequence the concentricity of the two rotary bodies.

Figure 3:
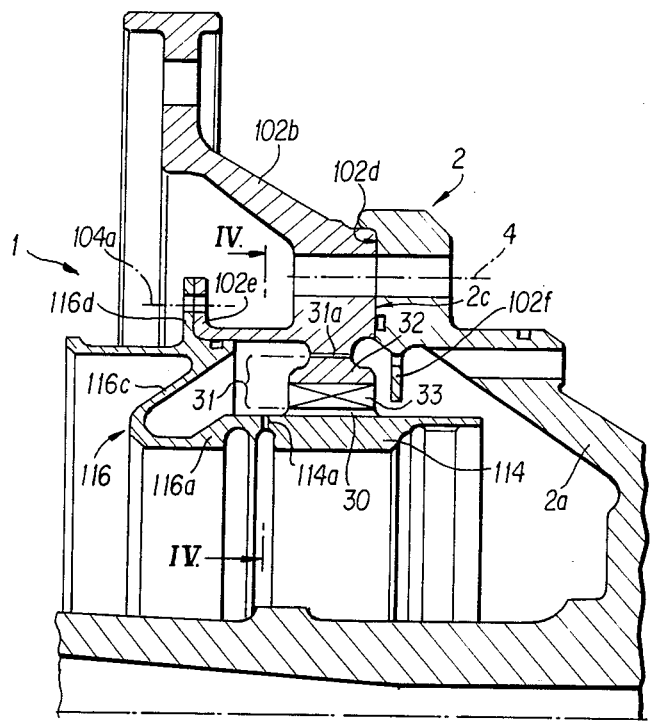
FIG. 3 is a section similar to that of FIG. 1 of that part of a multi-spool turbo-machine comprising a bearing assembly in accordance with a second embodiment.
Figure 4:
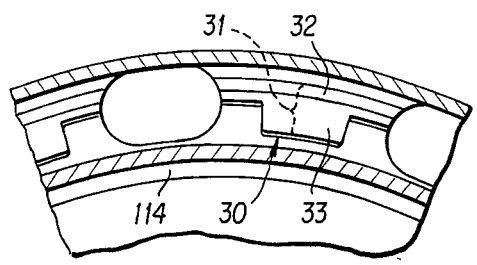
FIG. 4 is a fragmentary cross-section of the turbo-machine on the line IV—IV of FIG. 3.

In a similar manner, these same benefical results are also obtained by the second embodiment illustrated in FIGS. 3 and 4. In FIG. 3 an axial section along the longitudinal axis of the turbo-machine is illustrated and in a manner similar to FIG. 1 a part of a multi-spool turbo machine comprising a bearing assembly is designated by the general reference 1. With the aim of simplification, certain parts which correspond directly to the parts of the illustration given in FIG. 1 have not been reproduced in FIG. 3 and this applies in particular to the high-pressure shaft 3, to the roller bearing 5 with the rollers 6, the inner ring 7 and the outer ring 8 or to the associated parts, such as the annular nut 12, and the serrated ring 9. In FIG. 3, once again, the low-pressure shaft 2 and in particular the part 2a of the shaft itself have been shown. Those parts used in this second embodiment which have a similar function to the parts used in the first embodiment have received the same reference, but to which has been added one hundred.

The ring support member 114 carries in the interior thereof, the outer ring 8 of the roller bearing and now comprises at its external diameter, longitudinal grooves 30 (and corresponding teeth which in the example illustrated, and as shown in particular in FIG. 4, are twelve in number. This ring support member 114 is located axially by a body of revolution 116 in the form of a generally channel-section member in a manner similar to the first embodiment, but, in this second embodiment, the member 116 is disposed on the upstream side of the assembly.

The end of the first limb 116a disposed at the inside of the U-section member 116 is welded, for example, by electron beam, onto the upstream end face 114a of the ring support member 114. The second limb 116c disposed at the outer side of the member 116 is extended by a radial flange 116d an annular radial flange 102e connected to the annular member 102b of the low-pressure shaft 2.

The radial flanges 116d and 102e are assembled together by nuts and bolts at line 104a (only one shown). The two parts 2a and 102b of the low-pressure shaft are assembled by bolting at the lines 4 (only one shown) connecting their two radial respective faces 2c and 102d. At its internal diameter, the annular member 102b comprises members 31 which are twelve in number in the example illustrated in FIG. 4 and comprise a cylindrical base 32 and teeth 33. Each member 31 is connected to the internal diamter of the annular member 102b by a weld seam 31a, for example by electron beam welding.

As in the first embodiment, the profile of each of the twelve teeth 33 is matched by a precise adjustment with minimal clearance to the profile of a corresponding groove 30 of the ring support member 114. The lubrication and cooling of the teeth and grooves are effected by an annular oil film formed between the radial face 102d of the annular member 102b of the low-pressure shaft 2 and a radial flange 102f of the part 2a. This second embodiment thus enables the production of the same advantageous results as the first embodiment. It is possible to achieve in certain applications supplementary facilities in the production of the assembly.

We claim:

1. In a turbo-machine multi-spool inter-shaft bearing assembly comprising a first shaft of the low-pressure spool shaft line, a second shaft of the high-pressure spool shaft line located coaxially with the first shaft, journal bearing means including an internal ring rotatable with the second shaft, an external ring mounted within a ring support assembly for rotation with the first shaft and roller bearing members operative between said internal and external rings, the improvement comprising a first toothed element,
a second toothed element and,
an intermediate part, said ring support assembly comprising said elements and said intermediate part, the toothed elements meshing with minimal clearance between meshing parts, and the intermediate part being secured for rotation with the first shaft, and
a body of revolution having a cross-section that includes a substantially U-shaped channel section, serving to locate axially said ring-support assembly and being secured to the first shaft for rotation therewith,
wherein the low pressure shaft further comprises a radial face and the first toothed element of the ring support assembly comprises a plurality of regularly-spaced teeth on its outer periphery, and the second toothed element comprises a plurality of paired parts, the outline of each pair of parts being capable of being inscribed within the volume of an imaginary right triangular prism of which one of the apices is replaced by a groove formed between adjacent teeth of said second toothed element, said groove having a width matched to the width of a corresponding tooth of said first toothed element, and wherein said bearing assembly further comprises means securing the plurality of paired parts of the said low pressure spool shaft against the said face of the low pressure shaft.

2. A bearing assembly according to claim 1 wherein
said ring support assembly further comprises a ring support member for contacting and supporting said external ring,
said body of revolution comprises means for positioning the ring support member by contacting it at the downstream side thereof,
said low-pressure shaft comprises a substantially radial face,
said body of revolution comprises a radial flange interposed between said radial face of the low-pressure shaft and the plurality of paired parts, and
said ring support assembly further comprises:
an annular retention member disposed upstream of the said body of revolution and defining with the body of revolution a toroidal enclosure for said plurality of paired parts, and
securing means for securing the annular retention member, the plurality of paired parts, and the radial flange of the body of revolution to said radial face of the low-pressure shaft.

3. In a turbo-machine multi-spool inter-shaft bearing assembly comprising a first shaft of the low-pressure spool shaft line, a second shaft of the high-pressure spool shaft line located coaxially with the first shaft, journal bearing means including an internal ring rotatable with the second shaft, an external ring mounted within a ring support assembly for rotation with the first shaft and roller bearing members operative between said internal and external rings, the improvement comprising
a first toothed element,
a second toothed element and,
an intermediate part, said ring support assembly comprising said elements and said intermediate part, the toothed elements meshing with minimal clearance between meshing parts, and the intermediate part being secured for rotation with the first shaft, and
a body of revolution having a cross-section that includes a substantially U-shaped channel section, serving to locate axially said ring-support assembly and being secured to the first shaft for rotation therewith,
wherein said ring support assembly further comprises a ring support member for contacting and supporting said external ring,
said first toothed element comprises longitudinally-extending splines on the periphery of said ring support member, and
the second toothed element comprises a cylindrical base member and an array of axially-extending splines meshing with the splines of the ring support member, said cylindrical base member being secured to the low-pressure shaft.

4. A bearing assembly according to claim 3, further comprising an annular member of the low-pressure spool shaft line,
 said low-pressure shaft comprising a radial face,
 means securing the annular member to the radial face of the low-pressure shaft, and the annular member having an internal diameter, the cylindrical base member being welded to said internal diameter.

5. A bearing assembly according to claim 4 wherein the body of revolution is welded to an upstream face of the ring support member and wherein said annular member comprises an annular radial flange, the bearing assembly further comprising means securing the body of revolution against said annular radial flange of the annular member.

* * * * *

UNITED STATES PATENT AND TRADEMARK OFFICE
CERTIFICATE OF CORRECTION

PATENT NO. : 4,558,564
DATED : DECEMBER 17, 1985
INVENTOR(S) : BOUILLER ET AL

It is certified that error appears in the above-identified patent and that said Letters Patent is hereby corrected as shown below:

Column 2, line 15, change "clearnanes" to --clearances--.

Column 3, line 38, after "ring" (second occurrence) insert --8--.

Column 4, line 23, after "nuts" insert --and bolts--.

Column 5, line 4, after "teeth" insert --)--.

Column 5, line 17, after "116d" insert --abutting--.

Column 5, line 29, change "diamter" to --diameter--.

Signed and Sealed this

Second Day of December, 1986

Attest:

DONALD J. QUIGG

*Attesting Officer*                *Commissioner of Patents and Trademarks*